(12) United States Patent
Liu et al.

(10) Patent No.: US 8,120,901 B2
(45) Date of Patent: Feb. 21, 2012

(54) HARD DISK MOUNTING DEVICE

(75) Inventors: Lei Liu, Shenzhen (CN); Xiao-Feng Ma, Shenzhen (CN); Chia-Shin Chou, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 173 days.

(21) Appl. No.: 12/765,870

(22) Filed: Apr. 23, 2010

(65) Prior Publication Data

US 2011/0102999 A1 May 5, 2011

(30) Foreign Application Priority Data

Oct. 29, 2009 (CN) .......................... 2009 1 0309038

(51) Int. Cl.
*G06F 1/16* (2006.01)
(52) U.S. Cl. ................ 361/679.33; 312/319; 360/264.7; 345/419
(58) Field of Classification Search ............. 361/679.33, 361/679.58, 679.32, 679.46, 679.47, 679.31, 361/679.55, 679.41, 679.26, 679.04; 312/223.2, 323, 309, 319.1, 237; 165/104.33, 104.11; 360/97.01, 264.7, 244, 77.01, 73.03, 60, 97.02, 46; 455/575.4, 566; 200/550, 5 R; 345/8, 156, 690, 419

See application file for complete search history.

(56) References Cited

U.S. PATENT DOCUMENTS

| 7,324,308 B2 * | 1/2008 | Kimura et al. ................. 360/316 |
| 7,753,601 B2 * | 7/2010 | Sakai ............................ 396/480 |
| 2007/0206368 A1 * | 9/2007 | Zhang et al. .................. 361/801 |

* cited by examiner

*Primary Examiner* — Hung Duong
(74) *Attorney, Agent, or Firm* — Altis Law Group, Inc.

(57) ABSTRACT

A hard disk mounting device includes a receiving portion, a first adapter card, and a second adapter card. The receiving portion includes a bottom plate with a first end and a opposite second end. The first adapter card is attached to the first end of the bottom plate. The first adapter card includes a first connector located at a side of the first adapter card facing away from the second end of the bottom plate. The second adapter card is located at the center of the bottom plate, the second adapter card includes at least one connector e for connecting to a hard disk. The bottom plate includes at least one part for mounting hard disk, each part includes a first fixing mechanism for fixing a hard disk of a first size and a second mechanism for fixing a hard disk of a second size.

14 Claims, 6 Drawing Sheets

HARD DISK MOUNTING DEVICE

BACKGROUND

1. Technical Field

The present disclosure relates to a hard disk mounting device.

2. Description of Related Art

Hard disks are usually fixed in a hard disk mounting device to be installed in a server or a computer. However, by conventional methodology, each kind of mounting device is used to fix only one kind of hard disk, such as a 3.5-inch hard disk mounting device can only be used for fixing a 3.5-inch hard disk, and a 2.5-inch hard disk mounting device can only be used for fixing a 2.5-inch hard disk. Thus, in order for a server or computer to be ready to receive various kinds of hard disks, the server or computer should have various kinds of hard disk mounting devices. As a result, the server or computer would be too bulky.

What is needed is a hard disk mounting device capable of mounting various kinds of hard disks to overcome or at least mitigate the above described problem.

BRIEF DESCRIPTION OF THE DRAWINGS

Many aspects of the present hard disk mounting device can be better understood with reference to the accompanying drawings. The components in the drawings are not necessarily drawn to scale, the emphasis instead being placed upon clearly illustrating the principle of the hard disk mounting device. In the drawings, all the views are schematic.

DETAILED DESCRIPTION

Embodiments of the present disclosure will now be described in detail below, with reference to the accompanying drawings.

Figure 1:
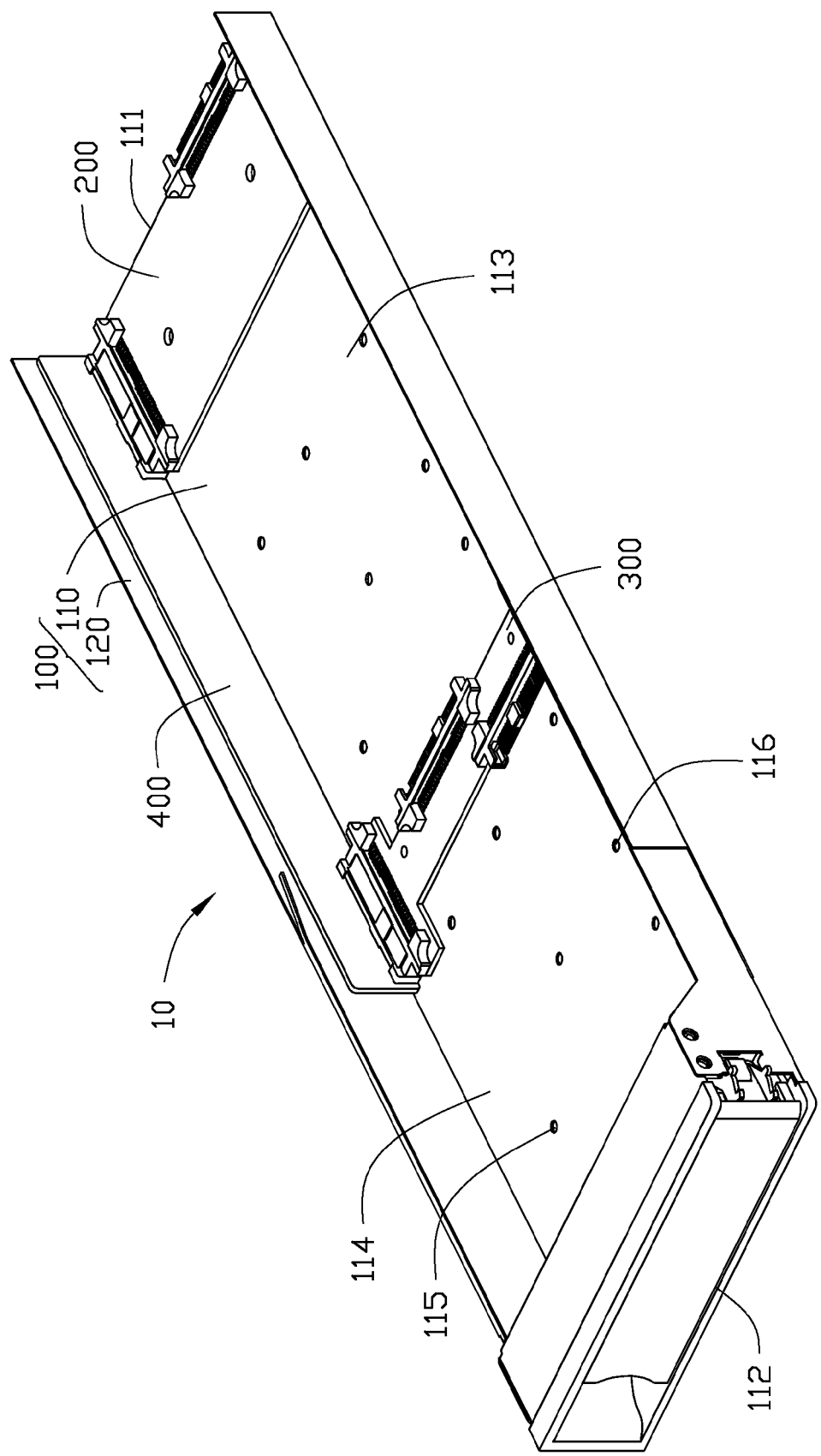
FIG. 1 is an assembled, isometric view of an exemplary embodiment of a hard disk mounting device.

Referring to FIG. 1, a hard disk mounting device 10 capable of mounting various kinds of hard disks is shown. The hard disk mounting device 10 includes a receiving portion 100, a first adapter card 200, a second adapter card 300, and a third adapter card 400.

The receiving portion 100 includes a bottom plate 110 and a side plate 120 extending vertically from a side of the bottom plate 110. The bottom plate 110 includes a first end 111 and a second end 112 opposite to the first end 111. The side plate 120 extends from the first end 111 to the second end 112.

Figure 2:
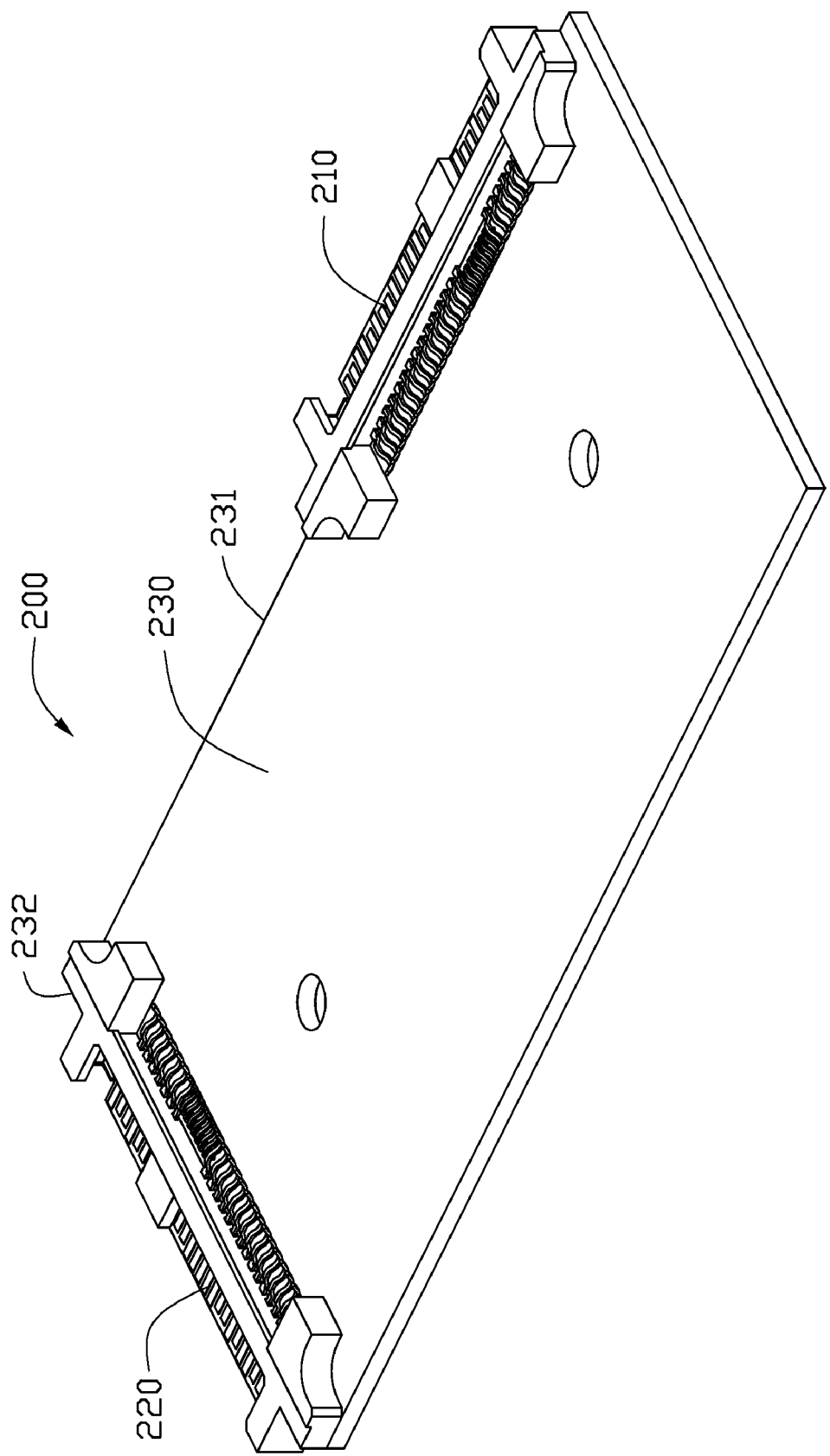
FIG. 2 is an isometric view of a first adapter card of the hard disk mounting device of FIG. 1.

Further referring to FIG. 2, the first adapter card 200 includes a first connector 210, a second connector 220, and a first circuit board 230 electrically connecting the first connector 210 to the second connector 220. The first circuit board 230 is attached to the first end 111 of the bottom plate 110. The first circuit board 230 includes a first side 231 facing away from the second end 112 of the bottom plate 110 and a second side 232 facing the side plate 120. The first connector 210 is located at the first side 231, and is configured for connecting to a motherboard of a server or computer (not shown). The second connector 220 is located at the second side 232 of the first circuit board 230. In the present embodiment, both of the first connector 210 and the second connector 220 are serial attached small computer system interface (SAS) male connectors.

Figure 3:
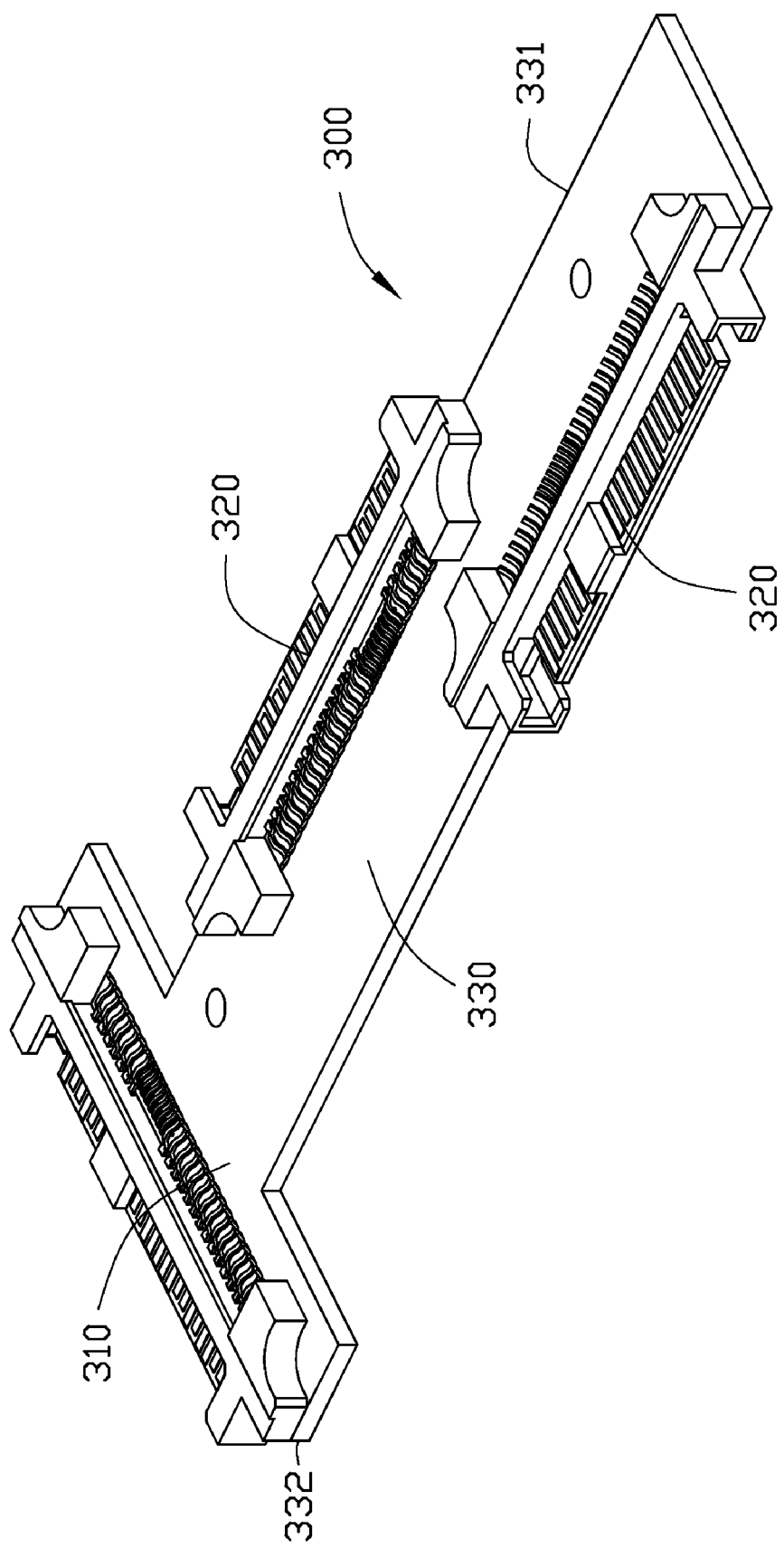
FIG. 3 is an isometric view of a second adapter card of the hard disk mounting device of FIG. 1.

Further referring to FIG. 3, the second adapter card 300 includes a third connector 310, two fourth connectors 320, and a second circuit board 330 electrically connecting the two fourth connectors 320 to the third connector 310. The second circuit board 330 is attached to the bottom plate 110 of the receiving portion 100, and is substantially located at the center of the bottom plate 110. The second circuit board 330 includes two opposite first sides 331 and a second side 332. The two opposite first sides 331 face the first end 111 and the second end 112 of the bottom plate 110, respectively, and the second side 332 faces the side plate 120. The third connector 310 is located at the second side 332, and the two fourth connectors 320 are located at the two first sides 331, respectively. In the present embodiment, the third connector 310 and the two fourth connectors 320 are all SAS male connectors.

Figure 4:
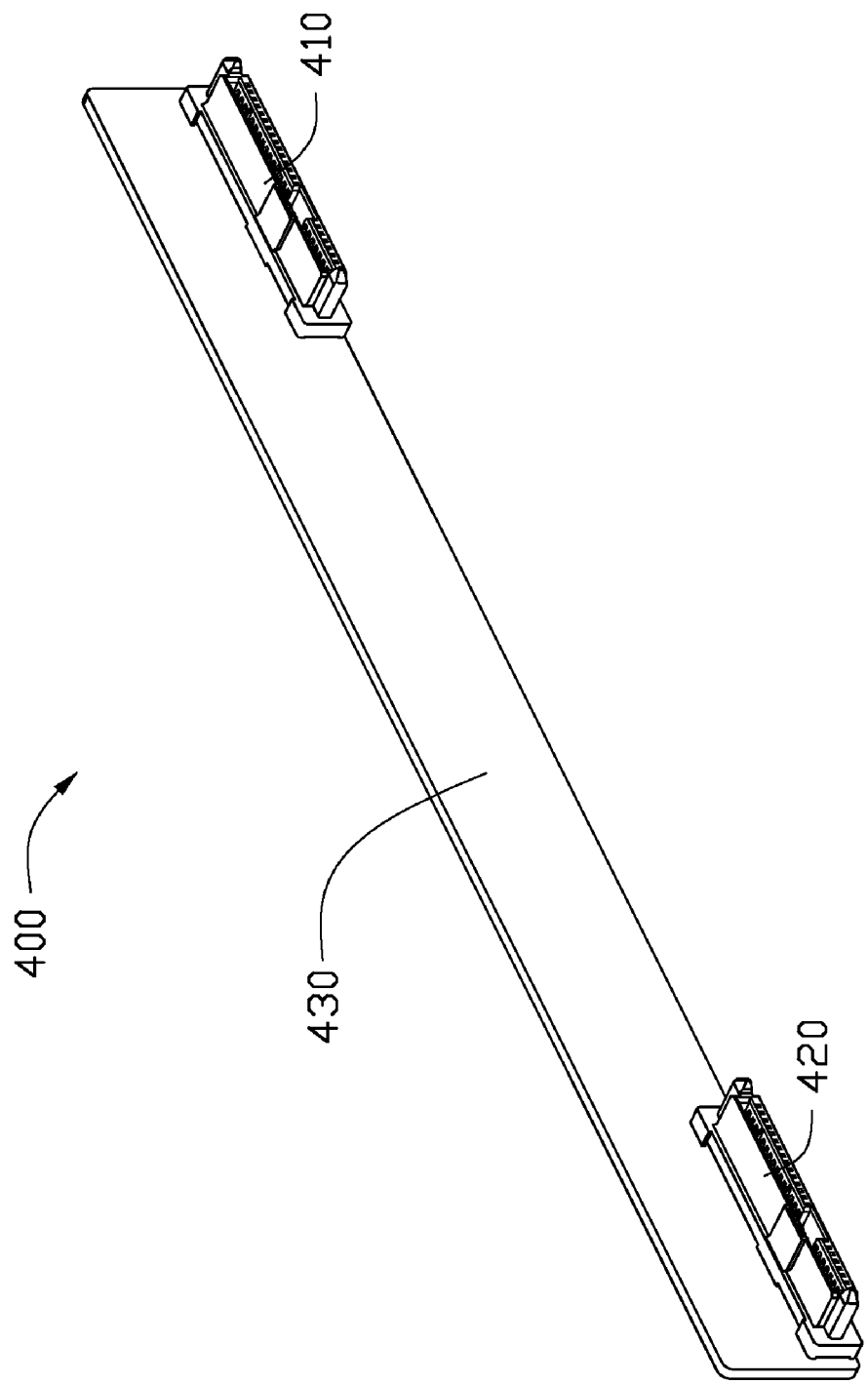
FIG. 4 is an isometric view of a third adapter card of the hard disk mounting device of FIG. 1.

Further referring to FIG. 4, the third adapter card 400 includes a fifth connector 410, a sixth connector 420, and a third circuit board 430 electrically connecting the fifth connector 410 to the sixth connector 420. The third circuit board 430 is attached to the side plate 120 of the receiving portion 100. The fifth connector 410 and the sixth connector 420 are linearly arranged on a side of the third circuit board 430 adjacent to the bottom plate 110 of the receiving portion 100. The fifth connector 410, adjacent to the first end 111 of the bottom plate 110, is configured for connecting to the second connector 220 of the first adapter card 200, and the sixth connector 420 is configured for connecting to the third connector 310 of the second adapter card 300. In the present embodiment the fifth connector 410 and the sixth connector 420 are SAS female connectors.

Figure 5:
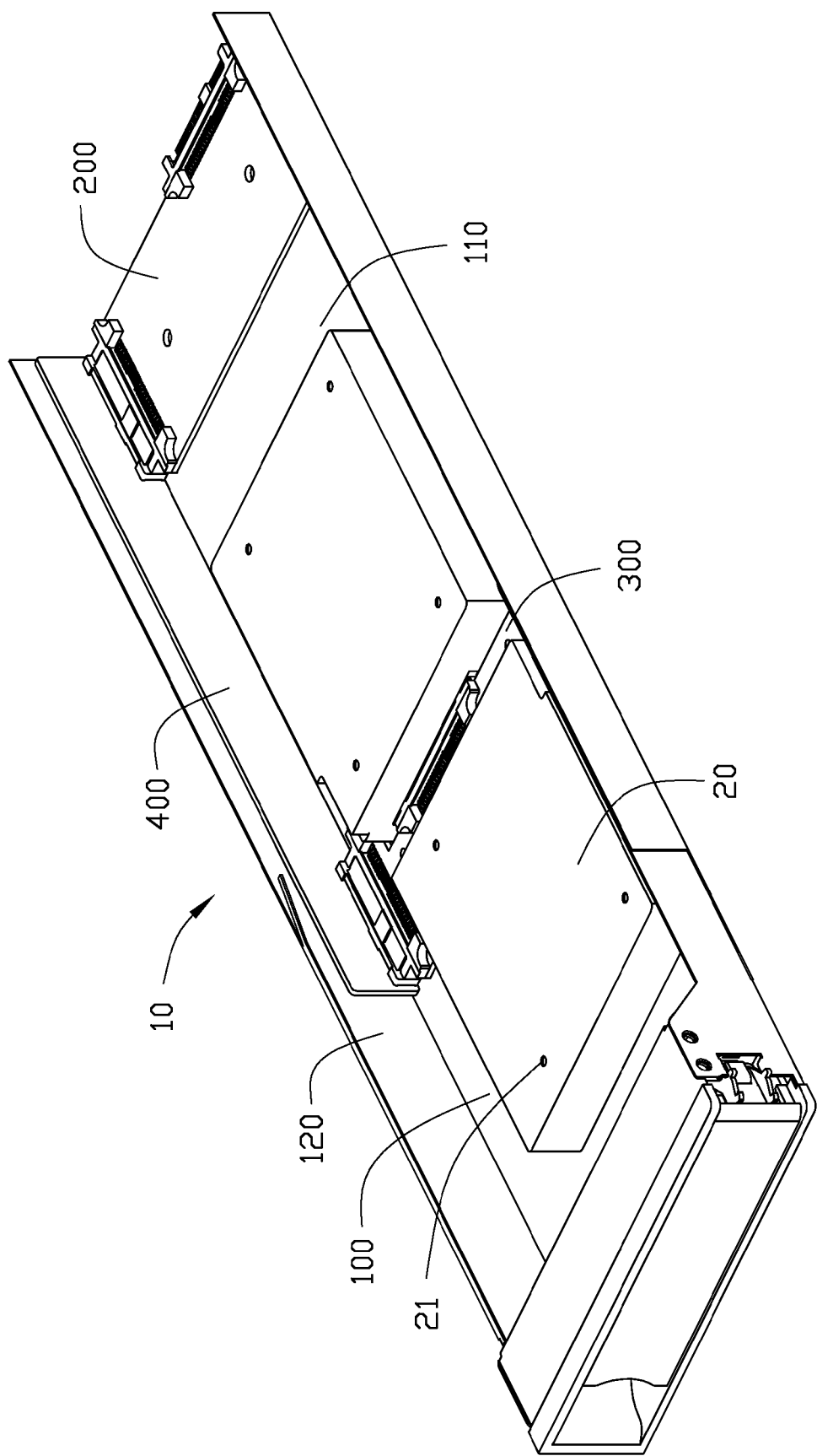
FIG. 5 is an assembled isometric view of the hard disk mounting device of FIG. 1 with hard disks of a first size installed therein.
Figure 6:
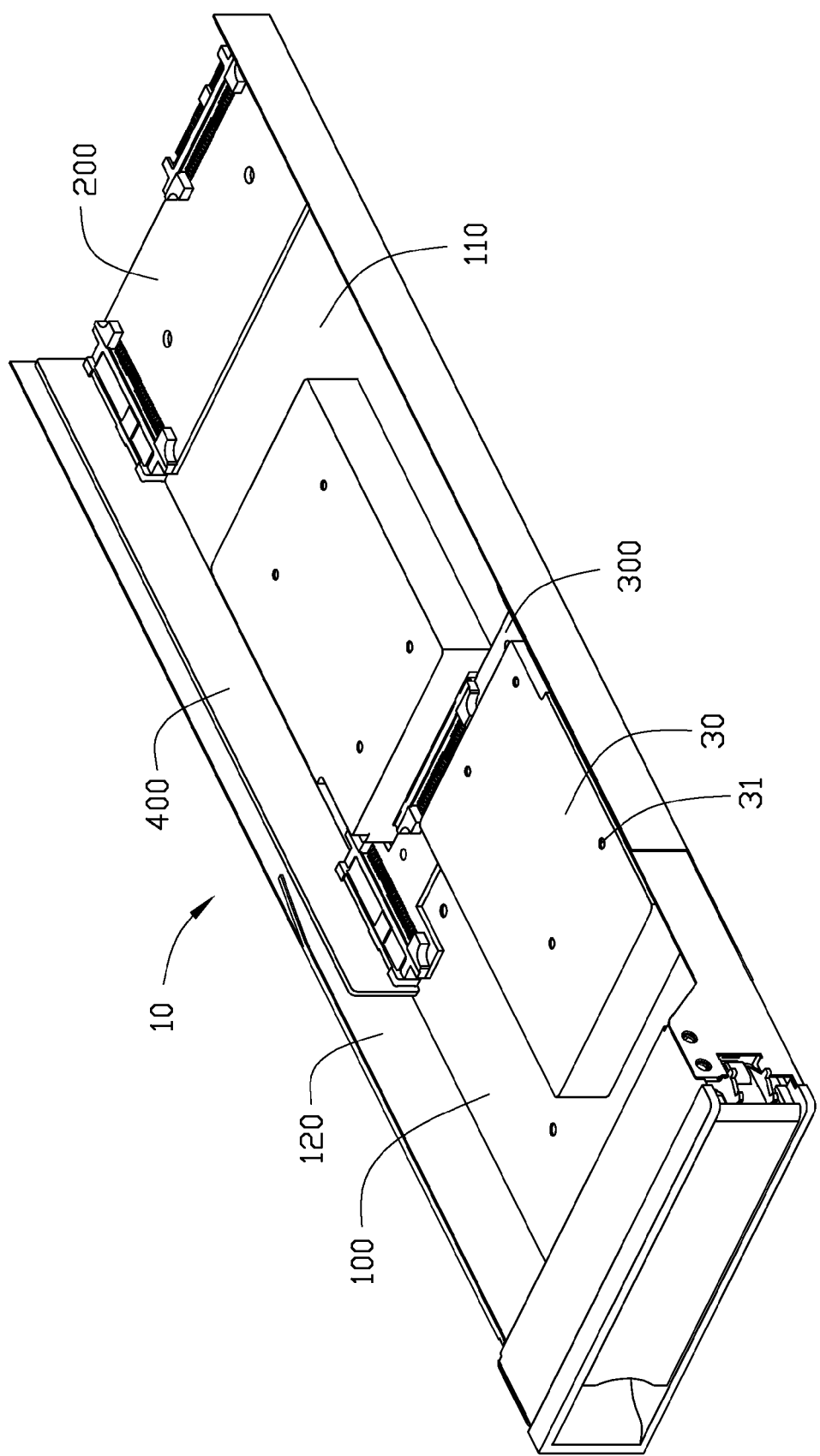
FIG. 6 is an assembled isometric view of the hard disk mounting device of FIG. 1 with hard disks of a second size installed therein.

Referring to FIGS. 1, 5 and 6, in the present embodiment, the bottom plate 110 includes a first part 113 located between the second adapter card 300 and the first adapter card 200, and a second part 114 located between the second adapter card 300 and the second end 112 of the bottom plate 110. Each of the first part 113 and the second part 114 includes a first fixing mechanism for fixing a hard disk 20 of a first size and a second mechanism for fixing a hard disk 30 of a second size. In the present embodiment, the hard disk 20 of a first size includes a number of screw holes 21, and the hard disk 30 of a second size includes a number of screw holes 31. The first fixing mechanism includes a number of first fixing holes 115 corresponding to the screw holes 21, and the second fixing mechanism includes a number of second fixing holes 116 corresponding to the screw holes 31. The hard disk 20 of a first size can be a 3.5-inch hard disk, and the hard disk 30 of a second size can be a 2.5-inch hard disk.

It should be understood, the kinds of fixing holes are not limited to the present embodiment. In other embodiments, each of the first part 113 and the second part 114 can also include a group of third fixing holes corresponding to a third size hard disk, a group of fourth fixing holes corresponding to a fourth size hard disk, an so on.

To mount the hard disk 20 of a first size or the hard disk 30 of a second size onto the bottom plate 110, the interface of the hard disk 20 of a first size or the hard disk 30 of a second size should be inserted into one of the two fourth connectors 320 first, and then a number of screws (not shown) can be inserted into the first fixing holes 115 or the second fixing holes 116 to engage with screw holes 21 or 31 on the hard disk 20 of a first size or the hard disk 30 of a second size.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope and spirit of the appended claims.

What is claimed is:

1. A hard disk mounting device comprising:
   a receiving portion comprising a bottom plate, the bottom plate comprising a first end and a second end opposite to the first end;
   a first adapter card attached to the first end of the bottom plate, the first adapter card comprising a first connector located at a side of the first adapter card facing away from the second end of the bottom plate; and
   a second adapter card located at the center of the bottom plate, the second adapter card comprising at least one connector electrically connected to the first connector of the first adapter card for connecting to a hard disk,
   wherein, the bottom plate comprises at least one part for mounting hard disks, each of the at least one part comprising a first fixing mechanism for fixing a hard disk of a first size and a second mechanism for fixing a hard disk of a second size.

2. The hard disk mounting device as claimed in claim 1, wherein the second adapter card comprises two connectors located at two opposite sides of the second adapter card, the two opposite sides respectively face towards the first end and the second end of the bottom plate, the bottom plate comprises two parts for mounting hard disk, the two parts are located between the second adapter card and the first adapter card, and located between the second adapter card and the second end of the bottom plate, respectively.

3. The hard disk mounting device as claimed in claim 1, wherein the hard disk mounting device further comprises a third adapter card for electrically connecting the first adapter card and the second adapter card.

4. The hard disk mounting device as claimed in claim 3, wherein the receiving portion further comprises a side plate extending vertically from a side of the bottom plate, and extending from the first end to the second end of the bottom plate, the third adapter card is attached to the side plate.

5. The hard disk mounting device as claimed in claim 1, wherein the first fixing mechanism comprises a plurality of first fixing holes used for fixing the hard disk of a first size.

6. The hard disk mounting device as claimed in claim 1, wherein the second fixing mechanism comprises a plurality of second fixing holes used for fixing the hard disk of a second size.

7. The hard disk mounting device as claimed in claim 1, wherein the hard disk of a first size is a 3.5-inch hard disk, and the hard disk of a second size is a 2.5-inch hard disk.

8. A hard disk mounting device comprising:
   a receiving portion comprising a bottom plate, the bottom plate comprising a first end and a second end opposite to the first end;
   a first adapter card attached to the first end of the bottom plate, the first adapter card comprising a first connector located at a side of the first adapter card facing away from the second end of the bottom plate; and
   a second adapter card located at the center of the bottom plate, the second adapter card comprising a connector facing towards the first adapter, the connector being electrically connected to the first connector of the first adapter card being configured for connecting to a hard disk,
   wherein, the bottom plate comprises a first part for mounting hard disks, the first part being located between the second adapter card and the first adapter card, the first part comprising a first fixing mechanism for fixing a hard disk of a first size and a second mechanism for fixing a hard disk of a second size.

9. The hard disk mounting device as claimed in claim 8, wherein the second adapter card further comprises another connector facing towards the second end of the bottom plate, the bottom plate further comprises a second part for mounting a hard disk, the second part is located between the second adapter card and the second end of the bottom plate.

10. The hard disk mounting device as claimed in claim 8, wherein the hard disk mounting device further comprises a third adapter card for electrically connecting the first adapter card and the second adapter card.

11. The hard disk mounting device as claimed in claim 10, wherein the receiving portion further comprises a side plate extending vertically from a side of the bottom plate, and extending from the first end to the second end of the bottom plate, the third adapter card is attached to the side plate.

12. The hard disk mounting device as claimed in claim 8, wherein the first fixing mechanism comprises a plurality of first fixing holes used for fixing the hard disk of a first size.

13. The hard disk mounting device as claimed in claim 8, wherein the second fixing mechanism comprises a plurality of second fixing holes used for fixing the hard disk of a second size.

14. The hard disk mounting device as claimed in claim 8, wherein the hard disk of a first size is a 3.5-inch hard disk, and the hard disk of a second size is a 2.5-inch hard disk.

* * * * *